Aug. 20, 1940.  W. FISCHER  2,211,970
URINAL SCREEN
Filed July 12, 1938
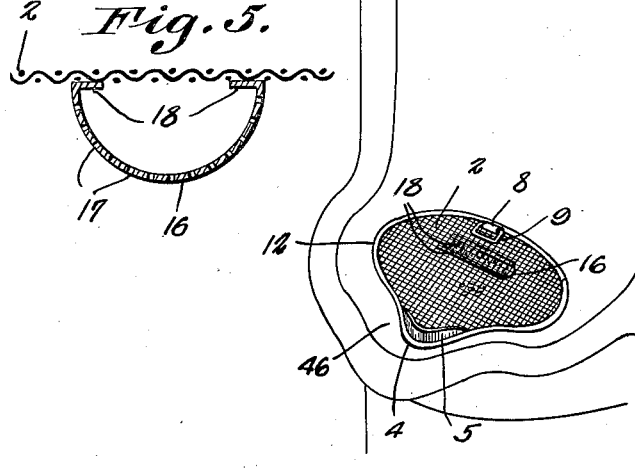
Fig. 1.
Fig. 5.
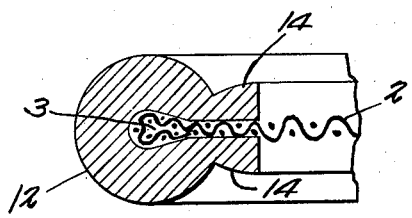
Fig. 2.
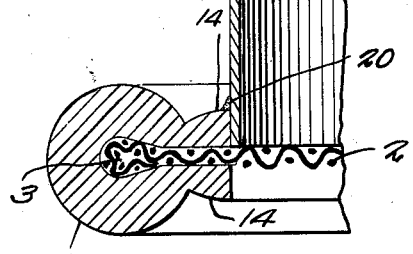
Fig. 3.
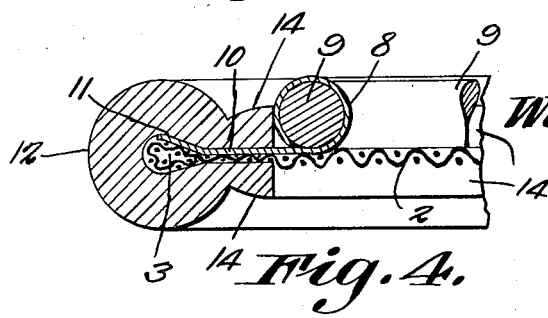
Fig. 4.
William Fischer
INVENTOR.
BY C. A. Snow & Co.
ATTORNEYS.

Patented Aug. 20, 1940

2,211,970

UNITED STATES PATENT OFFICE 2,211,970

URINAL SCREEN

William Fischer, Chicago, Ill.

Application July 12, 1938, Serial No. 218,847

2 Claims. (Cl. 4—109)

This invention has among its objects, the provision of a simple, durable and inexpensive screen for a urinal, the constituent portions of the screen being of novel form, and novel means being provided for holding them together, to form a strong and compact structure.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in perspective, a urinal wherein the device forming the subject matter of this application is mounted;

Fig. 2 is a transverse section through the body of the screen and through the binder;

Fig. 3 is a transverse section through the strip that forms a receptacle, through the body portion of the screen, and through attendant parts;

Fig. 4 is a section through the handle, the body portion of the screen, the binder and associated parts;

Fig. 5 is a vertical section showing the disinfectant receptacle.

The screen forming the subject matter of this application includes a foraminous body 2, which may be made of wire meshing. The edge portion of the foraminous body 2 is rolled or turned over to form a marginal reinforcement 3. The screen has a reduced forward end 4.

At the back of the screen is disposed an eye 8, in which a loop-shaped handle 9 is hingedly mounted. The eye has an arm 10, which rests on a portion of the body 2 of the screen. The arm 10 has an inclined finger 11, which is engaged over the reinforcement 3 of the body 2.

The reinforcement 3 of the body 2 and the arm 10 and the finger 11 of the hinge eye 8 are received within a tubular retainer 12, having inwardly projecting lips 14. The body 2 of the screen and the arm 10 of the hinge eye 8 are bound between the lips 14. The uppermost of the lips 14 is extended inwardly into abutment with the hinge eye 8, to support the hinge eye, and to keep it in position, as is indicated in Fig. 4. The tubular retainer 12 preferably is made of thick bendable metal, such as lead, and is pressed and clamped into the position shown in Figs. 2, 3, and 4 of the drawing. Because the retainer 12 is thick, and is made of lead or equivalent metal, the parts of the screen will be held together securely, and the binding of the parts together may be brought about cheaply, in a single pressing operation.

In the reduced end 4 of the screen is disposed an upstanding strip 5 having diverging walls. The strip 5 forms a receptacle for bits of cotton, cigarette butts and other trash likely to be cast into a urinal. The lower end of the strip 5 rests on the foraminous body 2, the strip 5 being secured by solder, shown at 20, to the uppermost of the wings 14 of the tubular retainer 12. The strip 5 abuts against the inner edge of the uppermost wing 14.

A semi-circular, trough-shaped receptacle 16, for disinfectant, is provided, and the receptacle is liberally perforated, as shown at 17, so that the disinfectant can find its way down into the urinal. The receptacle 16 is open at both ends, and, therefore, the disinfectant can be introduced readily into the receptacle. The receptacle 16 has inwardly projecting flanges 18, which are secured to the lower surface of the foraminous body 2, the receptacle being located about midway between the sides of the screen, and nearer to the back of the screen than to the front thereof. The flanges 18 of the receptacle 16 reinforce the foraminous body 2, especially when a pull is exerted on the handle 9, a condition to be desired, particularly in view of the fact that the part 12 is made of soft metal.

The general purpose of a device of the class described is known. It is placed in the bottom 46 of a urinal 15, over the outlet of the urinal, to prevent waste from finding its way into the outlet of the urinal and clogging the outlet.

Having thus described the invention, what is claimed is:

1. A urinal screen comprising a foraminous body, and a trough-shaped disinfectant receptacle located below the body, the receptacle being open at its ends and having transversely extended flanges which are secured to the body to reinforce the body.

2. A screen adapted to be disposed in a substantially horizontal position in a urinal, and comprising a foraminous body, the edge of which is turned inwardly to form a circumscribing bead, and a soft metal binder receiving the bead, the binder having inwardly projecting and inwardly widening wings, between which the body is directly bound, inwardly of the bead, the combined vertical thickness of the wings, throughout their entire extent, being less than the greatest vertical diameter of the binder, thereby to strengthen the soft metal binder without rendering it too bulky.

WILLIAM FISCHER.